Dec. 2, 1952  J. A. YOUNG  2,619,653
SANITARY URINAL PAN
Filed Aug. 4, 1949
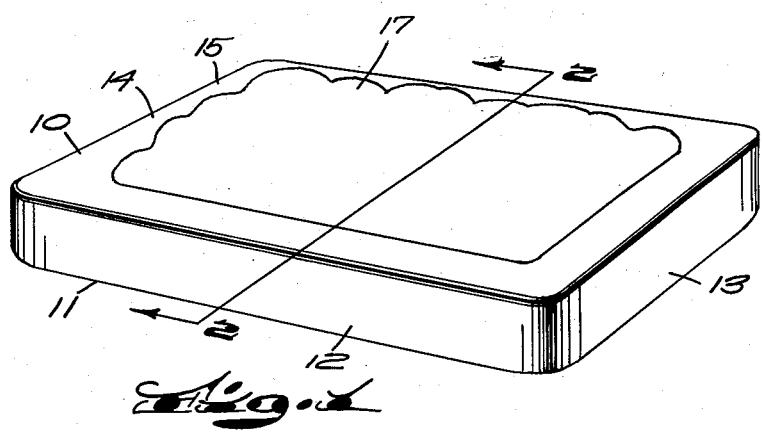
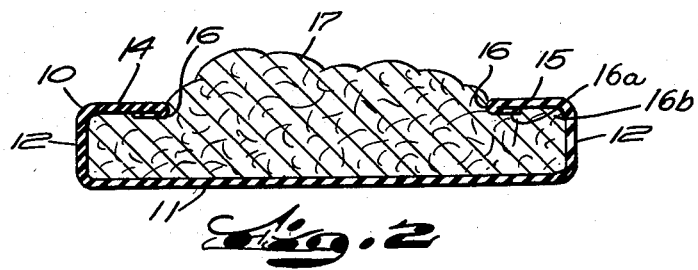
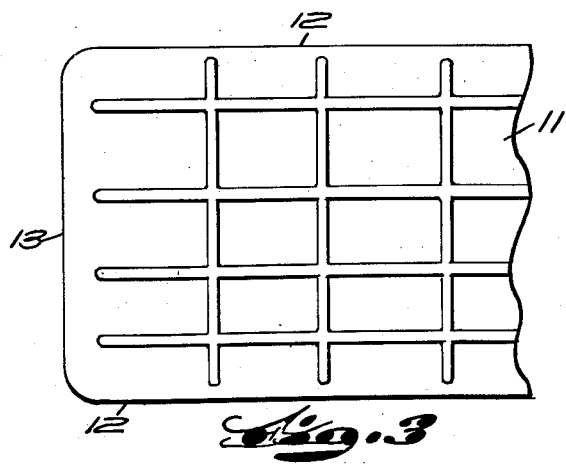
INVENTOR.
James A. Young
BY Nathaniel Frucht
Attorney Patented Dec. 2, 1952

2,619,653

UNITED STATES PATENT OFFICE 2,619,653

SANITARY URINAL PAN

James A. Young, Riverside, R. I., assignor to Davol Rubber Company, a corporation of Rhode Island Application August 4, 1949, Serial No. 108,611

1 Claim. (Cl. 4—112)

The present invention relates to hospital and sick room appliances, and has particular reference to a novel sanitary resilient urinal pan construction.

The principal object of the invention is to provide a sanitary resilient urinal pan for female patients.

Another object of the invention is to provide a sanitary resilient urinal pan that is sanitary in use.

A further object of the invention is to provide a urinal container of small size made of flexible rubber and having an open top for removably holding absorbent material.

With the above and other objects and advantageous features in view, the invention consists of a novel article more fully described in the detailed description following, in conjunction with the accompanying drawings, and more specifically defined in the claim appended thereto.

In the drawings,

Fig. 1 is a perspective view of a preferred form of the novel urinal pan;

Fig. 2 is an enlarged section on the line 2—2 of Fig. 1; and

Fig. 3 is a bottom plan view of Fig. 1, partly broken away.

It has been found desirable to provide a simple and effective sanitary urinal pan for female bed-ridden patients, as for example patients with hip bone fractures who cannot be lifted without discomfort. To this end, I have devised a novel self-supporting urinal pan made of resilient sheet rubber, of rectangular shape and with inturned edges to hold a removable packing of absorbent cotton or the like, whereby the pan may be readily positioned beneath a patient and will yield to be comfortable. I preferably provide the bottom of the pan with ribs or the like to prevent sliding, and fold in the edges of the pan to eliminate irritation and chafing.

Referring to the drawings, the novel pan 10 is preferably rectangular, with a base 11, side walls 12, and end walls 13, and an upper flange 14 for bordering a substantially open top 15, the flange having its edges beaded in or rounded as indicated at 16 in Fig. 2. to provide and annular depending abutment 16a and an annular recess 16b between the abutment and the side and end walls. The outer surface of the base 11 is preferably provided with ribs 18 or other corrugations to provide a slip resisting surface. The pan is filled with absorbent cotton 17 or similar absorbent material, the flange 14 being of sufficient width to retain the absorbent material in place while presenting a large surface of the absorbent material to the user through the open top. The pan is preferably made in one piece, of latex or similar resilient and waterproof material which is easily washed and kept sanitary and is of a size to hold a normal urine discharge in conjunction with the absorbent material.

Since the pan and the absorbent material are both yielding, they give under the weight of the patient and are not irritating or chafing. The small size of the pan permits quick removal, whereupon the absorbent material is removed, the pan washed and repacked, and positioned back in place.

Although I have disclosed a specific constructional embodiment of the invention, it is obvious that changes in the size, shape, and arrangement of the parts, and in the materials used, may be made to suit different patients and medical requirements, within the spirit and the scope of the invention as defined in the appended claim.

I claim:

In combination, a one-piece urinal pan of resilient rubber, having a rectangular bottom wall, rectangular side and end walls, and a flange of substantial width extending inwardly from the side and end walls in spaced relation to the bottom wall, whereby an open-top container is provided, said flange having a folded-in edge forming an annular depending abutment and an annular recess between the abutment and the side and end walls, and absorbent material in said container filling said container and recess and extending across the open top, and held in place by the flange and the depending abutment, the bottom wall having spaced ribs on its outer surface in parallel and transverse relation to the sides and providing rectangular slip-resisting corrugations.

JAMES A. YOUNG.

REFERENCES CITED

The following references are of record in the file of this patent:

UNITED STATES PATENTS

| Number | Name | Date |
| --- | --- | --- |
| 1,483,157 | Chabbert | Feb. 12, 1924 |
| 1,861,389 | Grosjean | May 31, 1932 |
| 1,965,558 | Weirich | July 3, 1934 |
| 2,157,394 | Beery | May 9, 1939 |
| 2,503,284 | Mason | Apr. 11, 1950 |
| 2,535,336 | Thompson | Dec. 26, 1950 |

FOREIGN PATENTS

| Number | Country | Date |
| --- | --- | --- |
| 564,345 | Germany | Nov. 17, 1932 |